No. 847,152. PATENTED MAR. 12, 1907.
R. H. BEEBE.
SWIVEL.
APPLICATION FILED DEC. 17, 1906.

WITNESSES

INVENTOR
Robert H. Beebe
BY
ATTORNEYS

UNITED STATES PATENT OFFICE.

ROBERT H. BEEBE, OF KALAMA, WASHINGTON.

SWIVEL.

No. 847,152.      Specification of Letters Patent.      Patented March 12, 1907.

Application filed December 17, 1906. Serial No. 348,207.

*To all whom it may concern:*

Be it known that I, ROBERT H. BEEBE, a citizen of the United States, and a resident of Kalama, in the county of Cowlitz and State of Washington, have invented a new and Improved Swivel, of which the following is a full, clear, and exact description.

This invention has for its object to provide a swivel which is simple in construction, effective in operation, durable in use, and adapted to be readily repaired when the parts become worn or broken.

Such objects I accomplish by the means illustrated in the accompanying drawings, in which drawings like characters of reference indicate like parts throughout the views, and in which—

Figure 1:
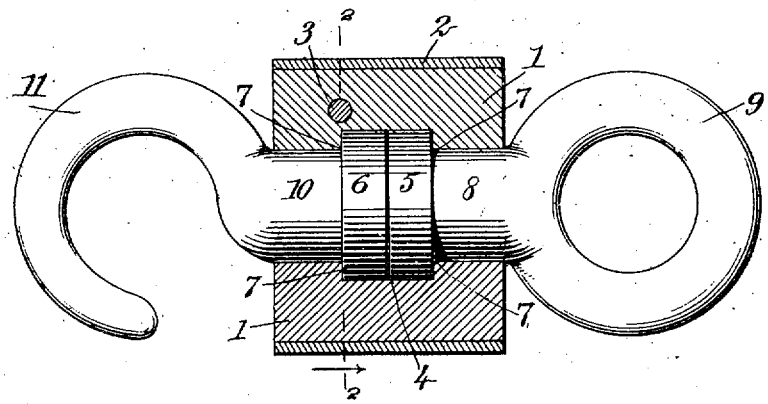
Figure 2:
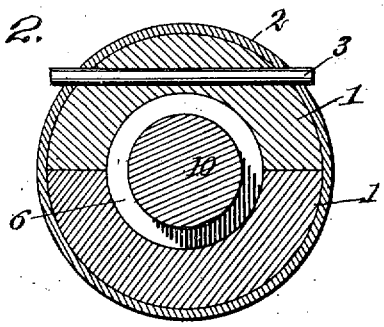

Figure 1 is a longitudinal section, partly in side elevation, of a device embodying my invention; and Fig. 2 is a vertical transverse section thereof, taken on the line 2 2 of Fig. 1.

As illustrated in the drawings, oppositely-disposed circular sections 1 of a split bearing-block are clamped together by means of a collar 2 and held firmly in position by a pin 3, which extends through said collar and one of the sections of the block, as shown in Fig. 2. The block-sections are provided with an annular recess adapted to receive and furnish bearings for flanges 5 and 6, formed on the shanks 8 and 10, respectively, of an eye 9 and hook 11. Shoulders 7 are formed in the bearing-block by means of a recess 4 and adapted to bear against the flanges 5 and 6 and hold said flanges in rotary engagement with the recess in the block. The collar 2 is made with an inner diameter sufficient to enable the sections of the bearing-block carrying the eye 9 and hook 11 to pass into the collar when the parts of the swivel are being assembled.

It is obvious that the hook 11 may be detached from the block, if desired, and an eye substituted therefor. If desired, moreover, the eye-section of the swivel may be removed and a hook-section substituted therefor.

By means of such construction the members of the device may be quickly assembled and taken apart when desired, and when in operation the attaching members are held secured in position, yet adapted to rotate independently of each other. By means of such construction, moreover, the bearings for the flanges of the eye or hook are protected from dirt and other foreign matter, thereby enabling the parts to operate without unnecessary friction and adding to the wearing qualities of the device and enabling the swivel to last much longer in use than those of ordinary construction.

Having thus described my invention, what I claim as new, and desire to secure by Letters Patent, is—

1. A swivel comprising a split bearing-block provided with a central bore having an annular recess formed therein, attaching members provided with annular flanges on their inner ends journaled in said recess, a collar clamping the sections of said block together, and means for retaining said collar in position, substantially as shown and described.

2. A swivel comprising a sectional bearing-block provided with a central bore having an annular recess, attaching members provided with shanks journaled in said bore, and with annular flanges formed on their inner ends journaled in said recess, and means for detachably clamping said sections of the block together, substantially as shown and described.

3. A swivel comprising a sectional bearing-block provided with a central bore having an annular recess formed therein, an eye provided with a shank journaled in said bore, and with a flange held in said recess, a hook having a shank journaled in said bore and provided with a flange held in said recess, a collar clamping the sections of said block together, and means for retaining said collar in position, substantially as shown and described.

In testimony whereof I have signed my name to this specification in the presence of two subscribing witnesses.

ROBERT H. BEEBE.

Witnesses:
     ELIAS CARLSON,
     E. N. HOWE.